C. B. DALZELL.
EMULSIFIER.
APPLICATION FILED NOV. 24, 1919.

1,363,572.

Patented Dec. 28, 1920.
2 SHEETS—SHEET 1.

INVENTOR.
Charles B. Dalzell
By Parker & Prochnow,
ATTORNEYS.

C. B. DALZELL.
EMULSIFIER.
APPLICATION FILED NOV. 24, 1919.

1,363,572.

Patented Dec. 28, 1920.
2 SHEETS—SHEET 2.

INVENTOR.
Charles B. Dalzell
by Parker & Brochun
ATTORNEYS.

UNITED STATES PATENT OFFICE.

CHARLES B. DALZELL, OF LITTLE FALLS, NEW YORK, ASSIGNOR TO D. H. BURRELL & CO., OF LITTLE FALLS, NEW YORK.

EMULSIFIER.

1,363,572.     Specification of Letters Patent.     Patented Dec. 28, 1920.

Application filed November 24, 1919. Serial No. 340,320.

*To all whom it may concern:*

Be it known that I, CHARLES B. DALZELL, a citizen of the United States, residing at Little Falls, in the county of Herkimer and State of New York, have invented a new and useful Improvement in Emulsifiers, of which the following is a specification.

This invention relates to centrifugal emulsifiers or centrifugal machines for making emulsions. While the embodiment of the invention disclosed herein is primarily intended for making cream from sweet butter and water in which milk powder has been dissolved, the invention is not necessarily restricted to such use but is applicable to machines for making other emulsions or liquid mixtures.

In the emulsifiers heretofore used, of which I am aware, it has been customary to make the emulsion by forcing the liquid mixture to flow through restricted passages or openings, or between closely adjacent surfaces. Such machines are objectionable because they necessitate means for clarifying the liquid to remove solid particles or matter which would clog the small passages or openings for the liquid, and even the machines provided with centrifugal clarifying means have a tendency to clog up after running only a short time, which is probably due to the fact that the restricted passages become clogged by matter which is not heavier than the liquid, and is not removed by the clarifying means. If the restricted liquid passages or openings become clogged, the capacity of the machine will be materially reduced, and furthermore, the results will not be uniform because the openings may be unevenly clogged so that the discharge is not uniform.

The objects of this invention are to provide an efficient, practical and desirable emulsifier which has a large capacity, will give the maximum emulsifying effect, and will run continuously, or for long periods of time without becoming clogged or necessitating the cleaning of the machine, also to provide a centrifugal emulsifier in which the liquid is not passed through restricted passages or between closely adjacent faces, but in which the liquid has a free, unobstructed discharge, of such a nature as to prevent the clogging of the machine; also to construct the machine so that the rotary emulsifying element can be arranged to revolve about a horizontal axis so as to facilitate the driving of the same and avoid the necessity for gearing, which, owing to the high speed at which the machine is driven, would be subject to severe pressure and wear; also to construct the machine so that the liquid is subjected to successive emulsifications, or is emulsified in successive stages; also to improve centrifugal emulsifiers in the other respects hereinafter described and set forth in the claims.

In the accompanying drawings:—

Figure 1:
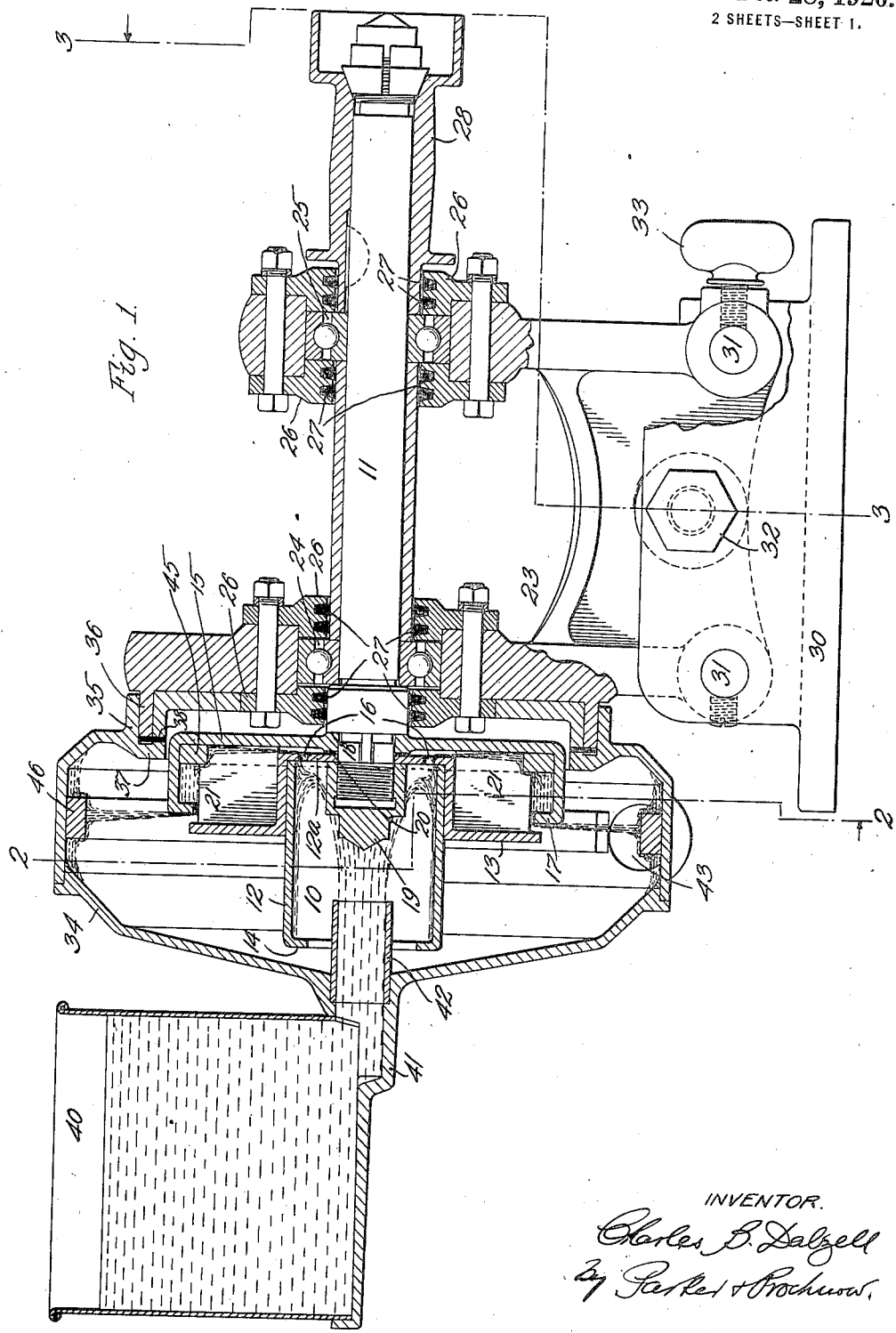
Figure 1 is a longitudinal sectional elevation of a centrifugal emulsifier embodying the invention.
Figure 2:
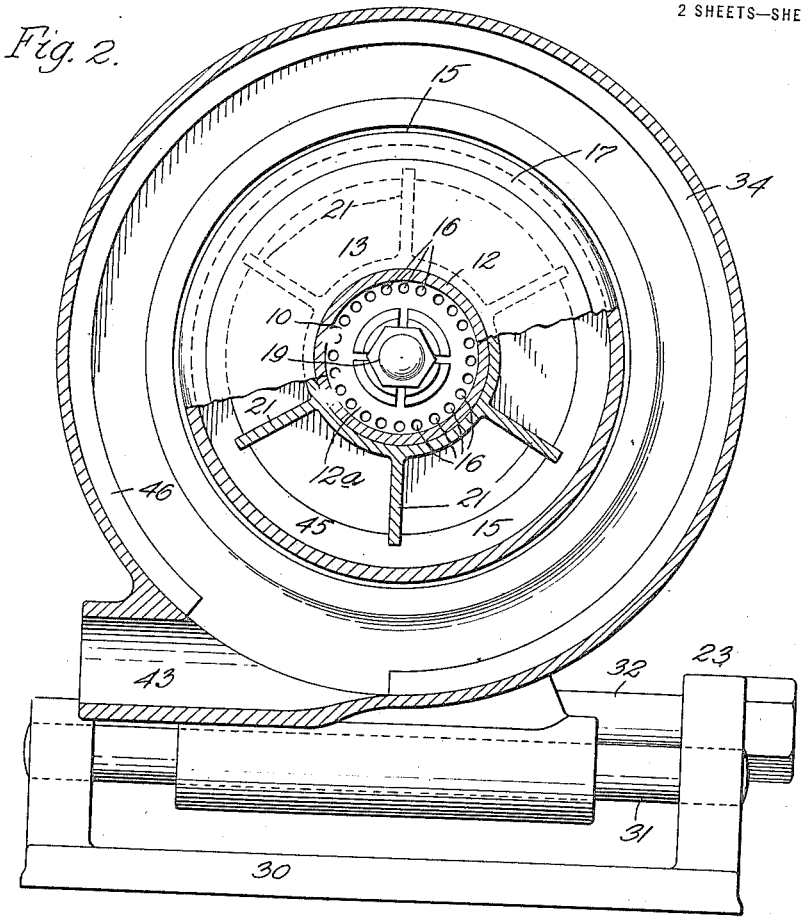
Fig. 2 is a transverse sectional elevation thereof on line 2—2, Fig. 1.

10 represents a primary or preliminary emulsifying element, bowl or chamber, which is preferably secured to and projects horizontally from a horizontal driving spindle or shaft 11. The bowl 10 can be of any suitable construction, but preferably it is composed of an open-ended hollow cylinder or shell 12 and an end plate 12$^a$ having a cylindrical depression in which the inner end of the cylinder is fitted, and an annular flange 13 which projects outwardly from the cylinder. The cylinder 12 shown, has an inwardly extending rim or flange 14 at its outer end. Both parts of the bowl can be readily made by drawing into the form shown. Also secured on the spindle 11 and surrounding the inner end of the primary bowl 10 is another or secondary emulsifying bowl or chamber 15 into which the partially emulsified liquid discharges from the primary bowl 10 through slots or openings 16 in the bottom or inner end of the latter. The secondary bowl 15 is of larger diameter than the primary bowl 10 and forms an annular emulsifying chamber around the bowl 10. This secondary bowl is preferably made in a single piece which can be readily drawn into the shallow cylindrical shape shown, and it also is shown as having an inwardly extending rim or flange 17. As shown the two bowls 10 and 15 are secured on the rotary spindle 11 between a shoulder 18 thereon and a nut 19 which is screwed on the threaded end of the spindle. A space is formed in any suitable way between the bottoms of the primary and secondary bowls to allow the free passage of the liquid from the bowl 10 into the bowl 15. For instance, the bottoms are spaced apart by a hub or spacing projection 20 on the central portion of the bottom of the secondary bowl.

21 represents blades or wings in the secondary bowl for facilitating the rotation of the liquid therein. These wings are preferably secured to the outwardly projecting flange 13 of the primary bowl and are disconnected from the secondary bowl so that when the bowls are removed from the spindle by removing the securing nut 19, the two bowls can be separated and ready access afforded to the interior of the secondary bowl and the blades for cleaning these parts.

The bowl spindle 11 can be journaled in any suitable way to rotate about a horizontal axis. As shown, the spindle is journaled in ball bearings 24 and 25 in a supporting frame 23, and caps 26, provided with suitable packings 27, are preferably employed at opposite ends of each of the bearings. These caps confine the oil for lubricating the bearings, and the packings for the bearing 24 next to the emulsifying bowl also serve to prevent the entrance of air into the liquid collecting vessel, hereinafter described, which incloses the emulsifying bowls. The spindle is preferably belt driven from a suitable motor or drive shaft, and for this purpose the spindle is provided at its outer end with a suitable belt pulley 28. In order to enable the bowl spindle to be adjusted relatively to the driving motor or shaft for properly tightening the drive belt, the frame 23 is preferably mounted on a suitable base 30 so as to move toward and from the motor or driving shaft, not shown, in a direction transversely of the axis of the spindle. As shown, the frame 23 is adapted to slide on parallel guide rods 31 on the base 30 and is adjusted by means of a screw 32 which is swiveled in the base and has a screw-threaded connection with the frame 23. When adjusted the frame is secured by a set screw 33. This adjusting means enables the frame 23, with the bowl spindle journaled thereon to be adjusted as may be required to insure the proper operation of the belt and driving of the spindle. The described manner of mounting and driving the bowls enables the latter to be driven at the high speeds necessary for emulsifying, which in the case of milk and cream is preferably about 12,000 R. P. M., and avoids the use of gears, which are not practical under the severe pressure and wear to which they would be subjected at such speeds. Any other suitable means for this purpose could be employed.

Figure 3:
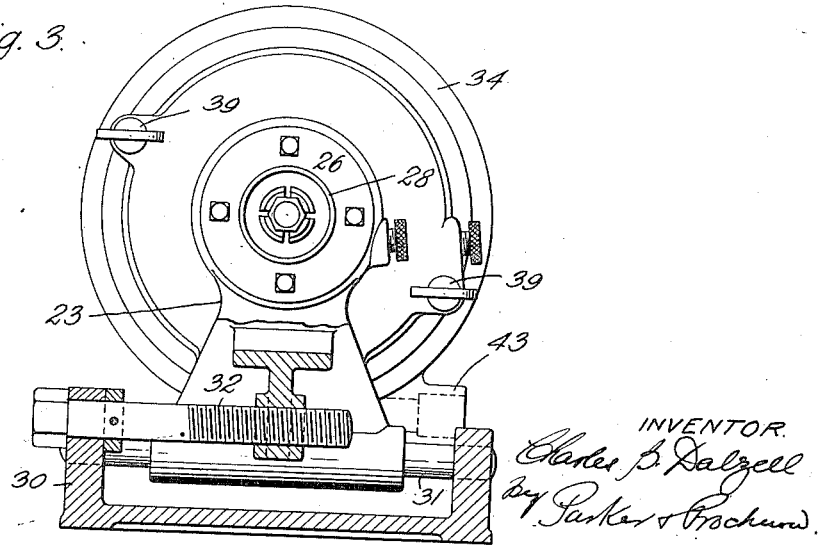
Fig. 3 is an end elevation, partly in transverse section, on line 3—3, Fig. 1, on a reduced scale.

34 represents a collecting vessel which surrounds and incloses the emulsifying bowls and is mounted on the supporting frame 23. The collecting vessel preferably has a rim or flange 35 at its inner end which removably fits on a cylindrical flange 36 on the supporting frame, and an inwardly projecting flange 37 between which and the edge of the flange 36 is arranged a packing 38 for making a tight joint between the collecting vessel and the frame. The vessel can be removably secured on the frame 23 by any suitable means, such for instance as clamping screws 39 shown in Fig. 3.

40 represents a reservoir or feed cup for the liquid mixture to be emulsified. This cup, in the construction shown, is secured on a bracket or part 41 projecting from the outer end of the collecting vessel, and has a discharge pipe or nipple 42 projecting into the open end of the primary bowl 10 for delivering the liquid centrally thereto. The feed of the liquid can be regulated in any usual or suitable way so as to make the operation of the emulsifier uniform.

In the operation of the emulsifier, the liquid mixture which has already had a coarse mixing, when delivered to the primary bowl, is thrown out against the peripheral wall thereof by centrifugal force and passes through the slots or openings 16 in the bottom of the bowl into the secondary bowl 15, and is thrown out against the peripheral wall of this bowl and escapes from the bowl over the rim or edge of this bowl into the collecting vessel 34. The liquid escapes from the collecting vessel through a suitable discharge spout or pipe 43 at the bottom of the collecting vessel. The liquid flows in thin films over the edges of the slots or openings 16 in the bottom of the primary bowl 10 and over the annular edge of the rim or flange 17 on the secondary bowl, and is emulsified by its movement over these edges, the edges having a sort of cutting action which reduces or divides the fat globules in the mixture into a very finely divided or comminuted condition. The emulsification is caused, not by forcing the liquid through restricted orifices or between closely adjacent faces, but by the free and unobstructed flow of the liquid over the edges of the openings 16 and the rim 17, and the slots or openings 16 can be large and numerous enough to allow such unobstructed discharge of the liquid. In fact, in so far as the emulsifying action is concerned, the primary bowl, if the mechanical construction would permit, could have a continuous annular discharge opening or edge functioning in the same way as the emulsifying edge 17 of the secondary bowl. The flange 13 of the bowl 10 which, as shown, is opposite the discharge rim 17 of the bowl 15, is so far removed therefrom that the discharging liquid does not strike this flange and is not impeded or obstructed thereby. This flange is useful for supporting the blades, but could be omitted without in anywise affecting the emulsifying action of the secondary bowl 15. Owing to the much larger diameter and peripheral speed of the secondary bowl 15, the liquid, which is partially emulsified by the edges of the discharge openings of the primary bowl, is further and more completely emulsified in its discharge from the secondary bowl, and a very perfect emulsion is thus formed.

By locating the discharge openings 16 of the bowl 10 and the discharge edge of the bowl 15 inwardly from the peripheral walls of the bowls, a clarifying space is provided in each bowl in which particles that are heavier than the liquid are separated therefrom by centrifugal action. While these clarifying spaces are not essential to the operation of the machine, on account of the free discharge of the liquid afforded by the unobstructed openings 16 and edge 17, they can, if desired, be provided for the purpose of removing heavy foreign matter from the liquid. As before explained, the opening through which the spindle 11 enters the collecting vessel is tightly closed by the packings 27, and air cannot enter through the opening. So long, therefore, as the feed spout remains full, no air can enter the collecting vessel 34 and blow through the film of liquid discharging from the bowl 15. This prevents the foaming of the cream, which is a serious objection to some emulsifiers.

If the liquid thrown out by centrifugal force from the primary bowl into the secondary bowl, and from the secondary bowl into the collecting vessel impinged directly upon the body or film of liquid against the peripheral walls of the bowl and vessel, this would cause an objectionable churning action which would result in the formation of particles of butter, in the case of emulsifying cream. In order to prevent this, a ring or annular projection 45 is provided in the peripheral portion of the secondary bowl in such a position that the mixture discharging from the primary bowl impinges on this ring or projection and flows off of the same to the peripheral wall of the bowl. In a like manner the collecting vessel is provided with a ring or annular projection 46 located so that the liquid discharging from the secondary bowl impinges against this ring or projection. These rings or projections project inwardly from the peripheral walls of the secondary bowl and collecting vessel respectively far enough for their inner surfaces to be exposed out of the films or bodies of the liquid collecting on the walls of the bowl and collecting vessel.

I claim as my invention:

1. A centrifugal emulsifier comprising a plurality of rotary emulsifying elements arranged to receive and act in succession on a liquid, and each having an unobstructed edge over which the liquid discharges freely by centrifugal action and which emulsifies the liquid, and means for supplying the liquid to the first of said emulsifying elements.

2. A centrifugal emulsifier comprising a plurality of rotary emulsifying elements arranged to receive and act in succession on a liquid, and each having an unobstructed edge over which the liquid discharges freely by centrifugal action and which emulsifies the liquid, the emulsifying edges of said elements being located at different distances from the axes of rotation of said elements, and means for supplying the liquid to the first of said emulsifying elements.

3. A centrifugal emulsifier comprising a plurality of emulsifying elements arranged to rotate together in the same direction and to receive and act in succession on a liquid, each of said elements having an unobstructed edge over which the liquid discharges freely by centrifugal action and which emulsifies the liquid, and means for supplying the liquid to the first of said emulsifying elements.

4. A centrifugal emulsifier comprising a plurality of emulsifying elements arranged to rotate together in the same direction and to receive and act in succession on a liquid, each of said elements having an unobstructed edge over which the liquid discharges freely by centrifugal action and which emulsifies the liquid, the emulsifying edges of said elements being located at different distances from the axes of rotation of said elements, and means for supplying the liquid to the first of said emulsifying elements.

5. A centrifugal emulsifier comprising primary and secondary rotary emulsifying chambers, said primary chamber having one or more liquid discharge openings and said secondary chamber being arranged to receive the liquid discharged from the primary chamber, means for supplying liquid to the primary chamber, and said secondary chamber having an unobstructed edge over which the liquid discharges freely by centrifugal action and which emulsifies the liquid.

6. A centrifugal emulsifier comprising primary and secondary rotary emulsifying chambers, said primary chamber being arranged within said secondary chamber and constructed to discharge liquid into the secondary chamber, means for supplying liquid into the primary chamber, said secondary chamber having a peripheral wall against which the liquid is held by centrifugal action and an annular edge over which the liquid discharges from said secondary chamber, said edge being removed from near proximity to any opposing surface whereby the liquid has a free, unobstructed flow over said edge.

7. A centrifugal emulsifier comprising a rotary emulsifying chamber, means for supplying liquid into the chamber, said chamber having a peripheral wall against which the liquid is held by centrifugal action and an edge over which the liquid discharges from the chamber, said edge being removed from near proximity to any opposing surface whereby the liquid has a free unobstructed flow over said edge.

8. A centrifugal emulsifier comprising a rotary emulsifying chamber, means for supplying liquid into the chamber, said chamber having a peripheral wall against which the liquid is held by centrifugal action and a continuous annular edge over which the liquid discharges from the chamber, said edge being removed from near proximity to any opposing surface whereby the liquid has a free unobstructed flow over said edge.

9. A centrifugal emulsifier comprising primary and secondary rotary emulsifying chambers, said primary chamber being arranged within said secondary chamber and having one or more openings in one end through which liquid discharges into the second chamber, means for supplying liquid into the primary chamber, said secondary chamber having an unobstructed peripheral edge of larger diameter than said primary chamber over which the liquid discharges freely by centrifugal action and which emulsifies the liquid.

10. A centrifugal emulsifier comprising a rotary emulsifying chamber having a peripheral wall against which liquid is held by centrifugal action, means for projecting the liquid toward said wall, and a surface in said chamber against which the projected liquid impinges and which prevents the same from impinging directly against the liquid on said peripheral wall.

11. A centrifugal emulsifier comprising a rotary emulsifying chamber having a peripheral wall against which liquid is held by centrifugal action, means for projecting the liquid toward said wall, an annular projection which extends inwardly from said peripheral wall and against which the projected liquid impinges and which prevents the same from impinging directly against the liquid on said peripheral wall.

12. A centrifugal emulsifier comprising an emulsifying chamber which rotates about a horizontal axis and which has a peripheral wall against which liquid is held by centrifugal action, means for projecting the liquid toward said wall, and a surface in said chamber against which the projected liquid impinges and which prevents the same from impinging directly against the liquid on said peripheral wall.

13. A centrifugal emulsifier comprising an emulsifying chamber which rotates about a horizontal axis and which has a peripheral wall against which liquid is held by centrifugal action, means for projecting the liquid toward said wall, and an annular projection which extends inwardly from said peripheral wall and against which the projected liquid impinges and which prevents the same from impinging directly against the liquid on said peripheral wall.

14. A centrifugal emulsifier comprising a rotary emulsifying chamber having a peripheral wall against which liquid is held by centrifugal action and an edge over which the liquid discharges, means for projecting the liquid toward said wall, a collecting vessel surrounding said emulsifying chamber to receive the liquid discharging therefrom, and surfaces in said emulsifying chamber and said collecting vessel against which the projected liquid impinges and which prevent the same from impinging directly against the liquid on said peripheral wall and on the wall of said collecting vessel.

15. A centrifugal emulsifier comprising an emulsifying chamber which rotates about a horizontal axis and which has a peripheral wall against which liquid is held by centrifugal action and an edge over which the liquid discharges, a collecting vessel surrounding said emulsifying chamber, annular projections which extend inwardly from said peripheral wall and the wall of said collecting vessel respectively and against which the projected liquid impinges and which prevent the same from impinging directly against the liquid on said peripheral wall and the wall of said collecting vessel.

16. A centrifugal emulsifier comprising a rotary emulsifying chamber having a peripheral emulsifying edge over which the liquid discharges by centrifugal action, a collecting vessel surrounding said chamber for receiving the discharging liquid, a spindle for rotating said chamber projecting out of said collecting vessel, and means closing the spindle opening in said vessel to prevent the entrance of air into the collecting vessel.

17. A centrifugal emulsifier comprising an emulsifying chamber which rotates about a horizontal axis and which has an edge at its peripheral portion over which the liquid is discharged from said chamber by centrifugal action, said edge being removed from near proximity to any opposing surface whereby the liquid has a free unobstructed flow over said edge, means for supplying the liquid into said chamber, and a collecting vessel surrounding said chamber for receiving the liquid discharging therefrom.

18. A centrifugal emulsifier, comprising a rotary emulsifying chamber having an emulsifying edge over which the liquid discharges by centrifugal action, a collecting vessel surrounding said chamber for receiving the discharging liquid, a spindle for rotating said chamber projecting out of said collecting vessel, and means closing the spindle opening in said vessel to prevent the entrance of air into the collecting vessel.

Witness my hand this 21st day of November, 1919.

CHARLES B. DALZELL.

Witnesses:
SAMUEL HOUPT,
R. J. THORP.